Patented Aug. 9, 1932

1,870,388

UNITED STATES PATENT OFFICE

WALTER C. SMITH, OF MAPLEWOOD, NEW JERSEY, ASSIGNOR TO CERRO DE PASCO COPPER CORPORATION, OF NEW YORK, N. Y., A CORPORATION OF NEW YORK

PROCESS FOR REFINING BISMUTH

No Drawing. Application filed January 21, 1931. Serial No. 510,324.

This invention relates to the refining of bismuth metal and more particularly to an improvement in the procedure for separating lead from alloys of bismuth and lead, whereby the last portions of the lead may be removed from the alloy.

It has previously been known that by passing chlorine or other halogen gases through molten bismuth containing lead and zinc these metals will react with the gas to form the corresponding halides of the metal. These halides float up through the molten metal and may be removed as a slag. In following this procedure, it has been found that when the concentration of lead is reduced to such a point that only about 4 to 5 hundredths of a per cent of lead remains in the alloy, the continued treatment with the halogen gas does not bring about a further separation of the lead, which appears to be dissolved in the bismuth either in the form of the free metal or as a lead compound. Attempts have been made to free the bismuth of this last portion of lead by adding caustic soda, but this appears merely to remove the chlorine absorbed in the metal and the lead apparently goes into solution in the bismuth.

It is an object of this invention to remove this last trace of lead from the bismuth. It is also an object to provide a method whereby bismuth in the slag may be recovered and the removal of lead from the alloy may be brought about more quickly and with a smaller quantity of halogen gas. Other objects will become apparent.

I have found that if, when the chlorination step is completed, air is bubbled through the molten metal, a further and substantially complete removal of the lead may be had.

In following my improved procedure, I prefer to maintain the alloy at a temperature of between that at which the slag solidifies and about 400 to 425° C. while passing the chlorine, or other halogen gas, through the molten metal. The operation, if carried out at these temperatures, may be carried out in an iron kettle, using iron pipes for introducing the gas, and the loss of bismuth and lead during the operation may be reduced. Of course, other more expensive and fragile materials, such as pyrex glass, porcelain, silica, graphite, etc., may be used in place of the iron pipe. A layer of slag from the latter portion of a previous run may be added to the molten metal. To this layer of slag I prefer also to add bismuth oxide in relatively small quantities, for example, about 4 to 6 pounds per ton of molten metal at a time, without adding so much that the slag becomes too viscous. The presence of the bismuth in the slag appears to hasten the removal of the lead from the alloy, the lead replacing the bismuth in the slag. This slag may be removed from time to time.

When the removal of the lead is nearly completed, that is, when the lead has been reduced down to a content of about 0.05 to 0.1%, the formation of slag ceases and the metal begins to fume, probably due to the escape of bismuth chloride which reacts with the moisture in the air to liberate hydrochloric acid. The blowing with chlorine is continued for a short time after the slag ceases to form, for example, for about one half hour per ton per jet of chlorine, and the chlorine is then shut off. A considerable quantity of chlorine is still retained in the metal, either being mechanically held or being in a chemical combination.

When the above chlorination operation is completed, air is bubbled through the molten metal. Before bubbling the air through the metal I prefer to transfer the charge to a clean kettle in order to separate it from any lead that may be retained upon the walls of the kettle. During the blowing with air the temperature may be gradually increased, by external heat, to about 600° C. When the air is first blown into the molten metal, it appears to have little or no oxidizing effect upon the metal, but after a time, and apparently after the chlorine has all been removed, a heavy dross forms on the top of the metal. The completion of the removal of the chlorine can be accurately determined by observing a cast sample of the metal. As long as it contains any chlorine it will have a dead white surface, but as soon as the chlorine has all been removed, a film of soft, bluish green, iridescent oxide will form on the surface.

When the above tests indicate that the chlorine is entirely removed, the lead will also be removed and the air may be cut off. The remaining metal may be treated with caustic soda to remove other impurities.

By following this procedure, substantially all of the lead may be removed from the bismuth.

The dross which is formed during the air blowing contains a considerable portion of bismuth, which bismuth may be washed out by adding the dross to the slag on the surface of the metal being chlorinated. The chlorination appears to wash the bismuth out of the slag and also the bismuth added to the slag increases the rate of removal of the lead from the bismuth. The slag from the first portion of the chlorination contains mostly lead and may be treated to separate the lead. During the latter stage of the chlorination treatment, however, a considerable quantity of bismuth will be present in the slag and this slag may be applied to the surface of the molten metal during the early stage of a subsequent chlorination operation, whereupon the bismuth will be removed from the slag and the removal of lead will be hastened.

In describing a method of carrying out my improved process, it is not intended to thereby limit the invention to the particular embodiments described, it being apparent that many modifications of it may be used. For example, the chlorine held in the bismuth may be removed by other means of agitation, for instance, by passing inert gases or steam through the mass or by mechanical agitation. In using air or other oxidizing gases for this purpose, the additional oxidation action is obtained. Specific reference has been made to the use of chlorine during the separation of the lead and zinc. The other halogen gases may also be used for this purpose.

The terms used in describing and claiming the above invention have been used in their descriptive sense and not as words of limitation and it is intended that the equivalents of these terms be included within the scope of the appended claims.

What I claim is:

1. In the separation of metals from bismuth alloys, the steps comprising bubbling a halogen gas through the molten metal and thereafter bubbling air through the molten metal.

2. In the separation of metals from bismuth alloys containing lead, the steps comprising bubbling chlorine through the molten metal until the content of lead in the bismuth is reduced to less than 0.1%, transferring the molten mass to a clean kettle and bubbling air through the molten mass until substantially all of the lead is removed.

3. In the refining of bismuth alloys containing lead, the steps comprising bubbling a halogen gas through the molten metal until the lead content of the alloys has been reduced to less than about 0.1%, then bubbling air through the molten mass until a cast sample of the metal has a bluish iridescent surface.

4. In the separation of metals from bismuth alloys, the steps comprising bubbling a halogen gas through the molten metal maintained at an elevated temperature, not over about 425° C., until the mass fumes strongly, then passing air through the molten mass until a considerable quantity of dross forms.

5. In the separation of metals from bismuth alloys, the steps comprising bubbling a halogen gas through the molten metal and adding bismuth oxide to the slag formed during the chlorination while in contact with the molten metal.

6. In the separation of metals from bismuth alloys, the steps comprising bubbling a halogen gas through the molten metal, and adding a slag containing a considerable quantity of bismuth to the molten metal during the halogenation.

7. In the separation of metals from bismuth alloys, the steps comprising bubbling a halogen gas through the molten metal, adding a slag containing a considerable quantity of bismuth to the molten metal during the halogenation, and adding bismuth oxide to the slag during the halogenation.

8. In the separation of metals from bismuth alloys containing lead, the steps comprising bubbling chlorine through the molten metal maintained at an elevated temperature not over 425° C., until the lead has been reduced to less than 0.1%, and thereafter bubbling air through the molten metal while gradually increasing the temperature to not over 600° C. until substantially all of the lead has been removed.

9. In the separation of metals from bismuth alloys containing lead, the steps comprising bubbling chlorine through the molten metal maintained at about 400 to 425° C., until the lead content of the alloy has been reduced to less than 0.1%, adding a slag containing a considerable quantity of bismuth to the molten metal and adding bismuth oxide to the slag during the chlorination, thereafter bubbling air through the molten metal until substantially all the lead has been removed.

10. In the separation of metals from bismuth in bismuth alloys containing lead, the steps comprising bubbling a halogen gas through the molten metal until the main portion of the lead is removed and thereafter agitating the molten mass to remove retained lead and halogens.

11. In the separation of metals from bismuth in bismuth alloys containing lead, the steps comprising bubbling a halogen gas through the molten metal until the main portion of the lead is removed and thereafter agitating the molten mass by bubbling a gas through it to remove retained lead and halogens.

12. In the separation of metals from bismuth in bismuth alloys, the steps comprising bubbling a halogen gas through the molten metal and adding a bismuth compound of the class comprising oxides and halides to the slag formed during the chlorination while the latter is in contact with the molten metal.

13. In the separation of metals from bismuth alloys containing lead, the steps comprising bubbling chlorine into the molten metal until the content of lead in the bismuth is reduced to about .04–.05%, and thereafter bubbling air through the molten mass until substantially all of the lead is removed.

In testimony whereof, I have signed my name to this specification this 20th day of January, 1931.

WALTER C. SMITH.